No. 839,394. PATENTED DEC. 25, 1906.
A. R. KLEIN.
LIME DISTRIBUTER.
APPLICATION FILED MAY 10, 1906.
5 SHEETS—SHEET 1.
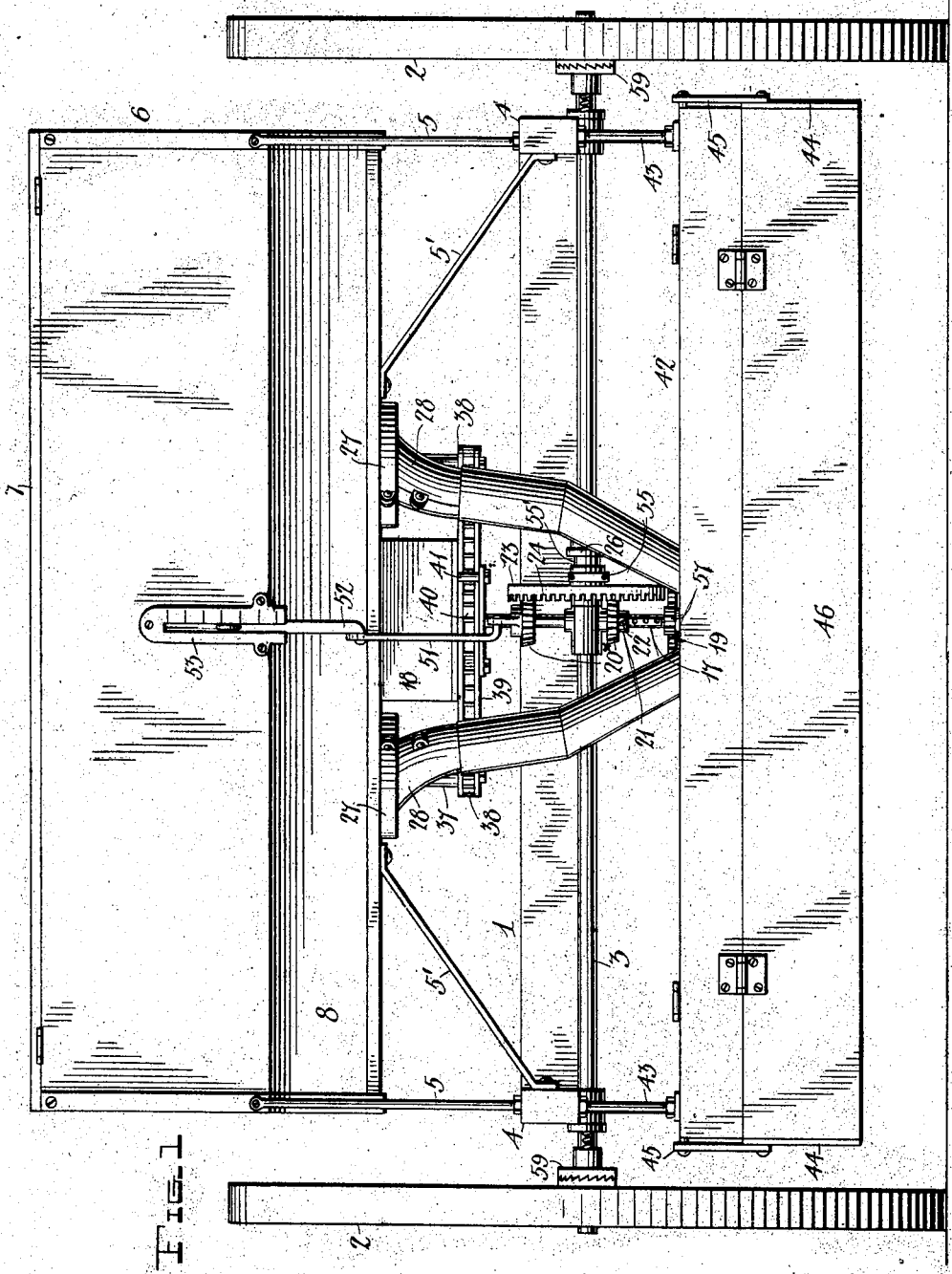
Witnesses
Inventor
Alexis R. Klein
by H. B. Willson & Co.
Attorneys

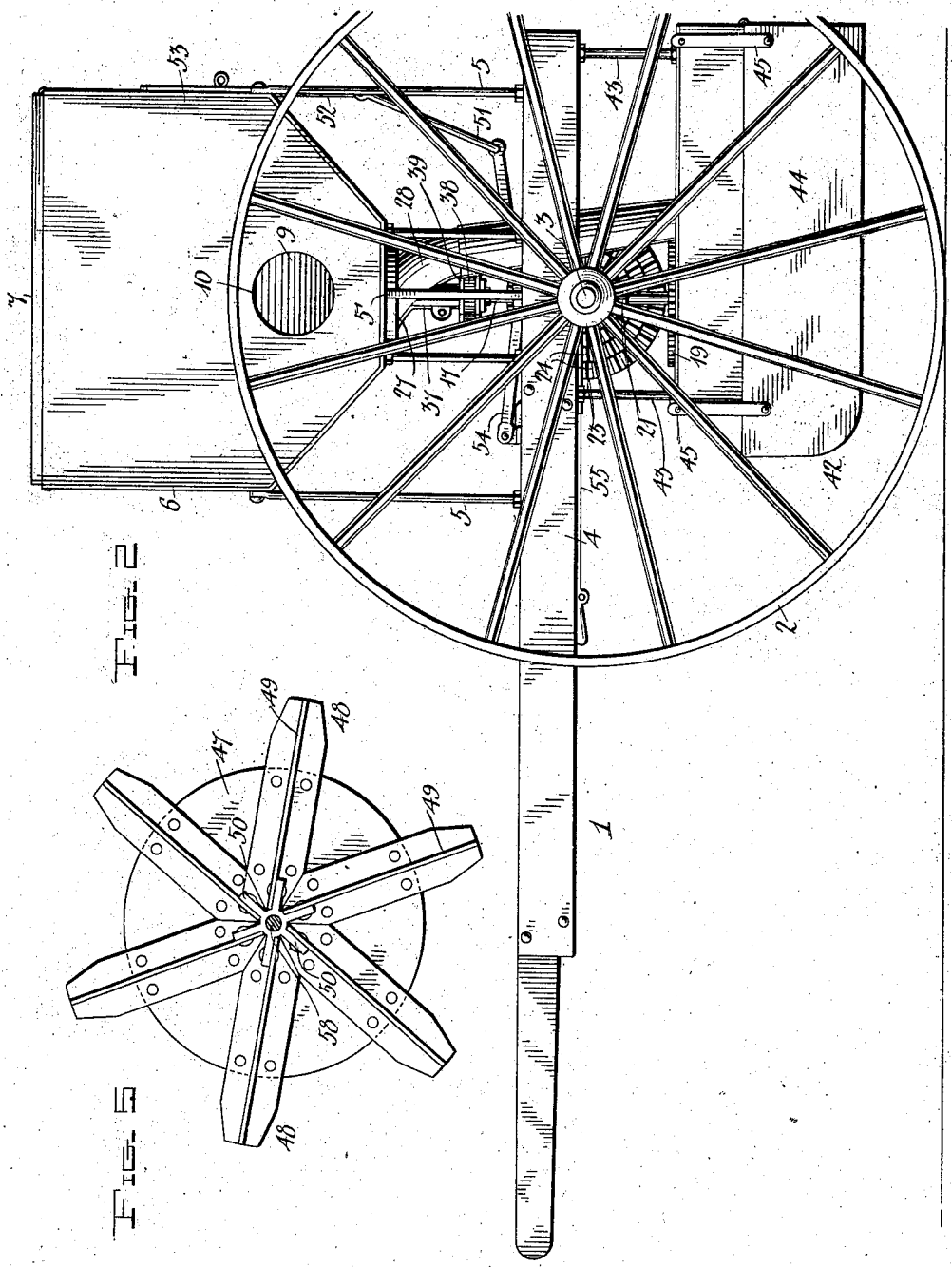

No. 839,394. PATENTED DEC. 25, 1906.
A. R. KLEIN.
LIME DISTRIBUTER.
APPLICATION FILED MAY 10, 1906.
5 SHEETS—SHEET 3.
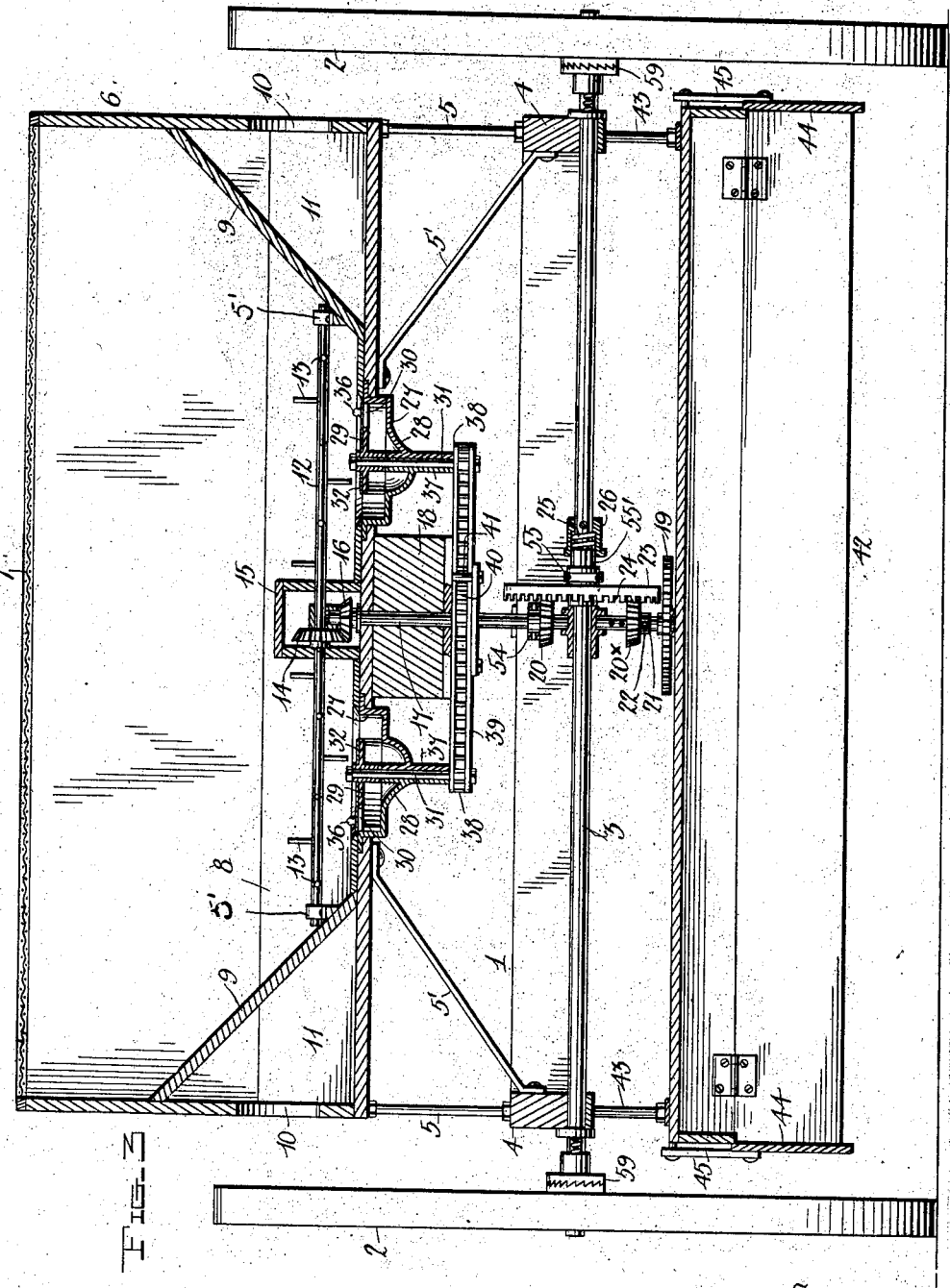
Witnesses
Inventor
Alexis R. Klein
by H. B. Willson & Co.
Attorneys No. 839,394. PATENTED DEC. 25, 1906.
A. R. KLEIN.
LIME DISTRIBUTER.
APPLICATION FILED MAY 10, 1906.
5 SHEETS—SHEET 4.
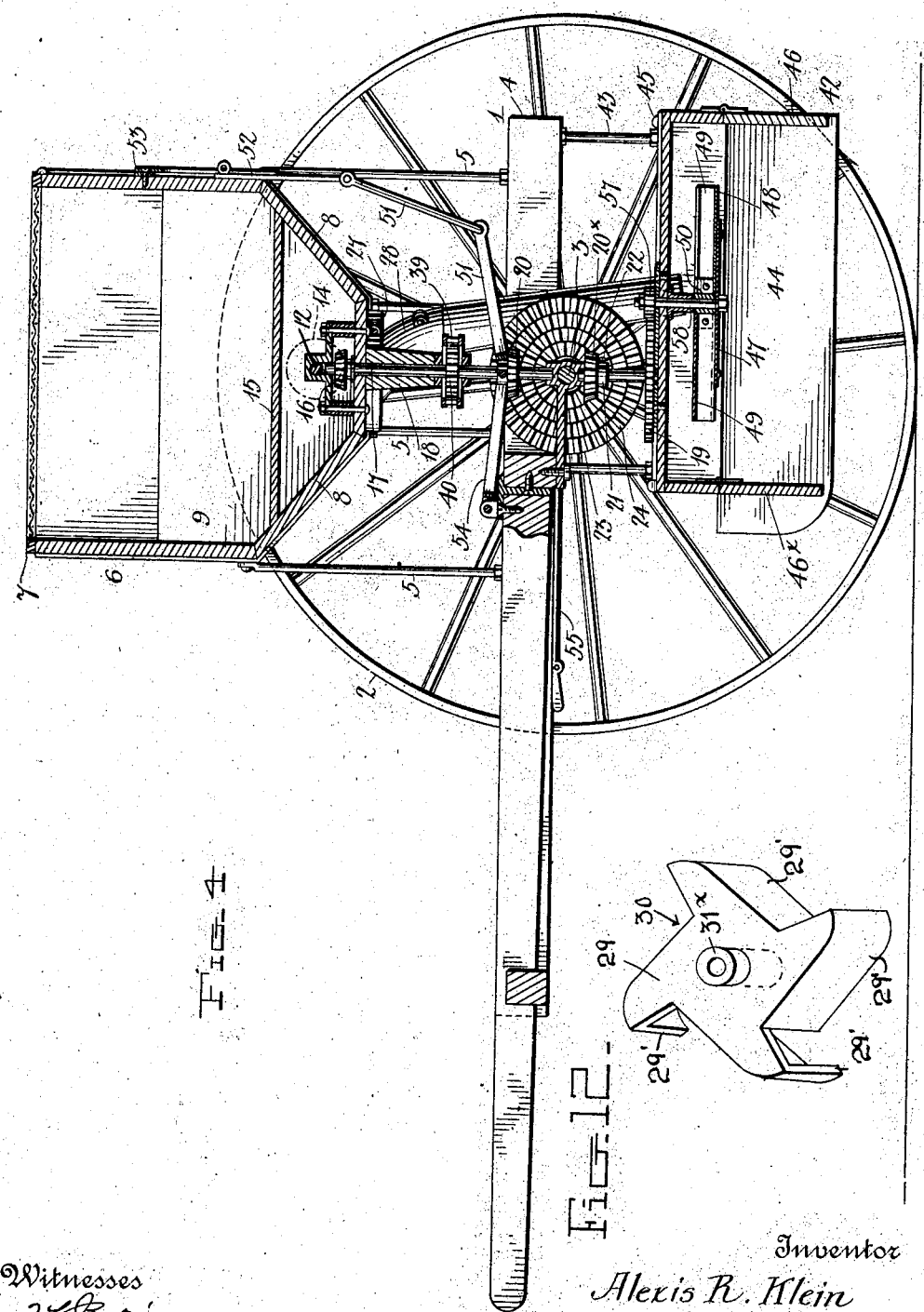
Witnesses
Inventor
Alexis R. Klein
by Attorneys No. 839,394.
PATENTED DEC. 25, 1906.
A. R. KLEIN.
LIME DISTRIBUTER.
APPLICATION FILED MAY 10, 1906.
5 SHEETS—SHEET 5.
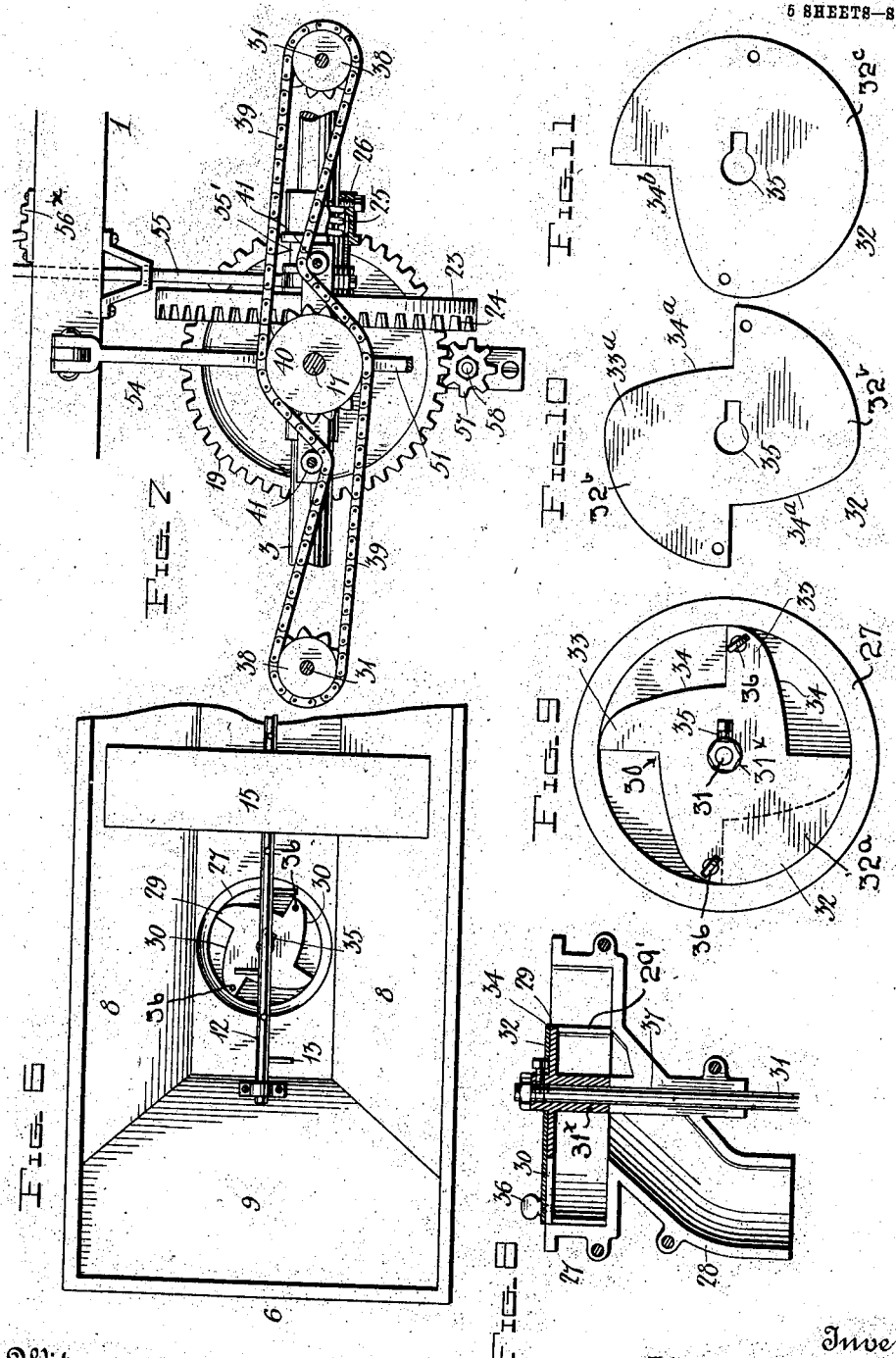
Witnesses
Inventor
Alexis R. Klein
by H. R. Willson & Co.
Attorneys

UNITED STATES PATENT OFFICE.

ALEXIS R. KLEIN, OF FREDERICK, MARYLAND.

LIME-DISTRIBUTER.

No. 839,394.      Specification of Letters Patent.     Patented Dec. 25, 1906.

Application filed May 10, 1906. Serial No. 316,200.

*To all whom it may concern:*

Be it known that I, ALEXIS R. KLEIN, a citizen of the United States, residing at Frederick, in the county of Frederick and State of Maryland, have invented certain new and useful Improvements in Lime-Distributers; and I do declare the following to be a full, clear, and exact description of the invention, such as will enable others skilled in the art to which it appertains to make and use the same.

This invention relates to fertilizer-distributers; and one of the principal objects of the same is to provide improved feeding means for the fertilizing material.

Another object is to provide means for regulating the quantity of fertilizer to be distributed upon the ground.

Still another object of my invention is to provide a rotating scatterer and two feed-tubes for conveying the fertilizer material upon opposite sides of the axis of said scatterer in order to insure a uniform and constant application of fertilizer to the land as the machine is drawn over the field.

Still another object is to provide means whereby the quantity of material distributed may be regulated and also means for indicating the quantity to be distributed.

Still another object is to provide means for screening the fertilizer when it is placed in the hopper by means of a sieve at the top of the hopper.

These and other objects are attained by means of the construction illustrated in the accompanying drawings, in which—

Figure 1 is a rear elevation of a machine embodying my invention. Fig. 2 is a side elevation of the same. Fig. 3 is a transverse vertical section of the same. Fig. 4 is a longitudinal section of the same. Fig. 5 is a plan view of the broadcast wheel or scatterer. Fig. 6 is a detail plan view looking into one portion of the hopper. Fig. 7 is a detail view of the operating parts and feed-regulating devices. Fig. 8 is a detail section of one of the feeding-tubes and the rotating disk for regulating the quantity of material fed therethrough. Fig. 9 is a plan view of the upper portion of the feed-tube and showing one form of feeding-disk for rotating therein. Fig. 10 shows a modified form of feeding-disk. Fig. 11 shows a still further modified form of said disk. Fig. 12 is a perspective detail view of a further modified form of feeding-disk.

Referring to the accompanying drawings for a more particular description of my invention, the numeral 1 designates the framework of the machine, mounted upon bearing-wheels 2, said wheels being fixed to an axle 3, mounted in the side frame-bars 4 of the machine.

Supported upon upright bars 5 and diagonal braces 5' is a hopper 6 for receiving the pulverized fertilizer material, and in the upper portion of said hopper is a screen or sieve 7, the purpose of which is to screen the material before it is fed into the machine. The hopper 6 at its lower side is contracted by means of the side pieces 8 and the inclined end pieces 9. An aperture 10 is formed in each end of the hopper in order that access may be gained to the compartments 11, which is designed to contain the necessary tools for repairing and adjusting the various parts of the machine. Mounted in bearings 5', near the bottom of the hopper 6, is an agitator-shaft 12, provided with radially-projecting pins 13 for breaking up the fertilizer material and insuring uniform feed.

On the shaft 12 is a bevel-gear 14, inclosed within a housing 15 and adapted to engage a similar gear 16 on a vertical shaft 17, journaled in a longitudinal bar 18, said shaft 17 comprising upper and lower sections and having upon its lower section a crown-gear or pinion 19. A beveled pinion 20 is mounted to slide upon this upper section of shaft 17. On the lower section of shaft 17 is a pinion $20^\times$, which can be adjusted by means of a collar 21 and set-screw 22. Mounted upon the shaft 3 is a disk 23, provided with a series of concentrically-arranged gear-teeth 24, said disk being held into engagement with one of the beveled gears 20 by means of a spring 25, mounted in a sleeve 26 and bearing against the hub of the disk 23. The purpose of this device is to adjust the speed of the rotating parts which feed and drop the fertilizer, and by regulating the speed of the rotating parts the quantity of material fed is also regulated.

Secured upon each of the shafts 31 within the casings 27 is a collar or sleeve $31^\times$, and integral with each collar is a disk or wheel 29, having spaced radial recesses 30, four being preferably employed, as shown, the recesses having one side radial to the shaft 31 and with the outer side curved eccentric to the shaft. The portions of the wheel between the recesses 30 operate close to the inner walls of the casing 27, and depending from the curved sides of the recesses are vertical webs 29', which form sweeps to conduct the material into the conductor-tubes 28, as hereinafter shown. A plurality of controlling-plates 32 are provided to be attached one at a time to each of the shafts 31, the plates having one, two, three, or four recesses corresponding to the recesses 30 of the wheels 29, as shown, by which means the quantities of the material passing to the conductor-tubes 28 may be regulated.

In Fig. 12 a plate having four of the recesses is shown and conforming to the recesses 30 of the wheel 29. In Fig. 9 a plate having three recesses 34 is shown, with the plate solid or without a recess at one side, as at $32^a$. In Fig. 10 a plate is shown having only two recesses $34^a$ at opposite sides, the remainder of the plate being solid, as shown at $32^b$. In Fig. 11 a plate is shown with one recess only at $34^b$, the remainder of the plate being solid, as at $32^c$.

The outer edges of the solid portions $32^a$, $32^b$, and $32^c$ are segments of circles corresponding to the interiors of the casings 27, so that they operate close enough thereto to prevent the passage of the fertilizer material except through the recesses 34, $34^a$, or $34^b$, as the case may be. Thus when the four recessed plates (shown in Fig. 12) are positioned upon the wheels 29 four pockets are formed to receive the material, which is conducted to the discharge-tube 28 by the rotation of the shafts 31 and their attached wheels and plates. On the other hand, when the plates with one recess $34^b$ only, as shown in Fig. 11, are employed one "pocket" only is produced and a correspondingly-limited quantity of the material will pass through the feeding devices at each revolution of each shaft. It will be obvious that in a like manner three of the pockets are produced by using the plate shown in Fig. 9 and two feed-pockets produced by using the plate shown in Fig. 10. The quantity of the material caused to pass through the discharge-tubes at each revolution of the shafts is thus easily controlled. The sleeves $31^\times$ extend above the wheels 29 and are provided in the extended portions with set-screws to enable the wheels to be detachably coupled to the shafts 31. Each of the controlling-plates 32 is provided with an aperture 35 for bearing over the extended upper ends of the sleeves $31^\times$, and each aperture is provided with a radial recess communicating therewith to bear over the set-screws. The controlling-plates 32 are further secured to the wheels 29 by thumb-screws 36. Secured to the central shaft 17 is a chain-wheel 40, and mounted for rotation at opposite sides of the chain-wheel are idler-rollers 41, and passing around the chain-wheels 38 on the lower ends of the shafts 31 is an endless chain 39, the chain also bearing against the idlers 41 and the opposite sides of the chain-wheel 40. By this simple means it is obvious that the rotary movement of the shaft 17 is simultaneously communicated to the shafts 31 of the feeding mechanism associated therewith.

Depending from the frame of the machine between the bearing-wheels is a transversely-extending box or casing 42, supported upon rods 43 and provided at opposite sides with swinging end boards 44, said end boards being suspended from pivoted links 45, so that as the machine passes over the ground said end boards will automatically raise and lower to always keep the ends of the box 42 closed. The front and rear ends of the box 42 are provided with hinged depending lids 46 and $46^\times$. The bottom of the box 42 is open, and the fertilizer is dropped through the bottom of this box. The broadcast wheel or scatterer, Fig. 5, consists of a disk 47 and a series of radial arms 48, secured thereto, said arms each having a central partition or rib 49 and a central hub 50, through which the shaft 58 passes, said hub being fixed to said shaft to rotate therewith. It is to be noted that the feed-tubes 28 extend through the upper portion of the box 42 and deposit the material upon the broadcast wheel or scatterer 47 at opposite sides of its axis, the result of which is that the material is uniformly thrown outward to spread a uniform quantity of material upon the ground within the limits of the box 42. It is also to be noted that the feed or flow of the fertilizer material may be regulated by means of the disks 32 and also by means of the beveled gears 20 and $20^\times$, the upper one of which is adapted to be adjusted to any one of the series of rows of concentric teeth 24 to regulate the speed of the rotating parts by means of the link 51, connected at one end to a sliding indicator-bar 52, adapted to slide within the slot in the indicator 53, secured to the rear side of the hopper. To move the links 51 and shift the upper gear 20, a lever 54 is provided. To shift the wheel 23 into and out of operative connection with the gear 20, a lever 55 is connected to the sleeve 56 at one side of the wheel 23, said lever being provided with a rack $56^\times$, secured to the frame of the machine, as shown in Fig. 7. The crown gear-wheel 19 imparts motion to a pinion 57, mounted upon a shaft 58, to which the broadcast wheel or scatterer is secured. Upon the axle 3, just inside the wheels, are oppositely-arranged spring-clutches $59^\times$, as shown in Fig. 1.

The operation of my machine may be described as follows: The fertilizer material to be distributed is placed within the hopper 6, being first screened by the sieve 7. The cogged disk 23 is thrown out of gear with the pinion 20 until it is ready to feed the material, the lever 55 then being operated to engage the gear 20 with one of the series of teeth on the disk 23. As the vehicle is drawn over the ground the axle 3 revolves, and this movement is communicated to all the rotating parts. The agitator 12, having the radial pins 13 insures that the fine particles of fertilizer will drop into the feed-wheels at opposite sides of the center at the bottom of the hopper and be fed in a uniform quantity through the tubes 28, through which the material is deposited upon the broadcast-wheel or scatterer-disk 47, from which the material is uniformly thrown outward by means of the ribs 49 on the radial arms 48. In order to regulate the feed, any one of the disks 32 shown in Figs. 10, 11 may be substituted for that shown in Figs. 8, 9. When the feed has been adjusted, the quantity being distributed will be indicated upon the indicator 53, as will be understood. End boards 44 prevent the material from blowing away after it has been thrown from the broadcast wheel or scatterer, said end boards riding over the uneven ground and dropping by gravity, as will be understood.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. In a fertilizer-distributer, a hopper, feed-chambers communicating with said hopper and provided with discharge-tubes, feed-wheels rotative in said chambers and provided with spaced radial recesses and operating to conduct the material from the hopper to the discharge-tubes, and controlling-plates having recesses corresponding to some of the recesses in said wheels and with unrecessed portions for closing the remaining recesses of the wheels.

2. In a fertilizer-distributer, a hopper, a cylindrical feed-chamber communicating with said hopper and provided with a discharge-tube extending centrally therefrom, a shaft extending through said chamber, a wheel carried by said shaft within said chamber and provided with spaced radial recesses and tangential depending wings, controlling-plates bearing upon said wheel and having recesses extending to some of the recesses therein and with unrecessed portions closing the remaining recesses in the wheel, means for detachably connecting said plates to said wheel, and means for rotating said shaft and the wheel and plate carried thereby.

3. In a fertilizer-distributer, a hopper, a cylindrical chamber communicating with said hopper and provided with a discharge-tube extending centrally therefrom, a wheel operating within said chamber and provided with spaced radial recesses and tangential depending wings, controlling-plates bearing upon said wheel and having recesses corresponding to some of the recesses therein and with unrecessed portions closing the remaining recesses in the wheel, means for detachably connecting said plates to said wheel, and means for rotating said wheel and the plate carried thereby.

4. In an apparatus of the class described, a supporting-frame, an axle carried by said frame, bearing-wheels carried by said axle and rotative therewith, a guard device consisting of a rectangular casing suspended from said frame and open at the lower side, a hopper carried by said frame, feed-chambers spaced apart and communicating with said hopper, discharge-tubes leading from said chambers and converging toward the center of the frame and entering said guard device, a distributer means disposed within said guard device in position to receive the material from said discharge device, feeding devices within said feed-chambers, and means operative from said axle for simultaneously operating said feeding devices and distributing devices.

5. In an apparatus of the class described, a supporting-frame, an axle carried by said frame, bearing-wheels carried by said axle and rotative therewith, a guard device consisting of a rectangular casing suspended from said frame and open at the lower side, a hopper carried by said frame, feed-chambers spaced apart and communicating with said hopper, discharge-tubes leading from said chambers and converging toward the center of said frame and entering said guard device, shafts spaced apart and operating through said feed-chambers, a central shaft mounted for rotation and extending into said guard device, a distributing device carried by said central shaft within said guard device, feed devices carried by said spaced shaft and operative within said feed-chambers, means for transmitting the motion of said axle to said central shaft, and means for transmitting the motion of said central shaft simultaneously to said feed mechanisms.

6. In an apparatus of the class described, a supporting-frame, an axle carried by said frame, bearing-wheels upon said axle and partaking of its motion, a hopper carried by said frame, feed-chambers spaced apart and carried by said hopper and communicating therewith, discharge-tubes leading from said chambers, shafts extending through said chambers, wheels upon said shaft within said chambers and having spaced radial recesses and depending tangential wings, controlling-plates bearing upon said wheels and having radial recesses corresponding to some of the recesses in said wheels and unrecessed portions closing the remainder of the wheel-recesses, a central shaft between said feed-chamber shafts, means for transmitting the motion of the axle to said central shaft, and means for transmitting the motion of said central shaft simultaneously to said feed-chamber shafts In testimony whereof I have hereunto set my hand in presence of two subscribing witnesses.

ALEXIS R. KLEIN.

Witnesses:
   J. TRAVERS THOMAS,
   JOS. McDIVIT.